United States Patent [19]

Kojima

[11] Patent Number: 4,459,696
[45] Date of Patent: Jul. 10, 1984

[54] PCM SIGNAL PROCESSOR WITH ERROR DETECTION AND CORRECTION CAPABILITY PROVIDED BY A DATA ERROR POINTER

[75] Inventor: Tadashi Kojima, Yokosuka, Japan

[73] Assignee: Tokyo Shibaura Denki Kabushiki Kaisha, Kawasaki, Japan

[21] Appl. No.: 302,078

[22] Filed: Sep. 14, 1981

[30] Foreign Application Priority Data

Sep. 16, 1980 [JP] Japan .................................. 55-128333

[51] Int. Cl.³ .......................... G06F 11/10; G11B 5/09
[52] U.S. Cl. .................................................... 371/38
[58] Field of Search ................................. 371/38, 37

[56] References Cited

U.S. PATENT DOCUMENTS

| 4,188,616 | 2/1980 | Kazami et al. | 371/37 |
| 4,306,305 | 12/1981 | Doi et al. | 371/38 |

FOREIGN PATENT DOCUMENTS

| 0029226 | 5/1981 | European Pat. Off. |
| 2423935 | 11/1979 | France. |
| 2440125 | 5/1980 | France. |
| 2443171 | 6/1980 | France. |
| 2019168 | 10/1979 | United Kingdom. |

OTHER PUBLICATIONS

Patent Abstracts of Japan, vol. 5, No. 118, P073, 790, (Jul. 30, 1981), Japanese Patent No. 56-58115.
Ishida et al., "A Rotary-Head PCM Recorder Employing Error Correction Technique," IEEE Transaction on Consumer Electronics, vol. CE-24, No. 4, pp. 526-533, (Nov. 1978).
"Consumer Use PCM Encoder-Decoder 1979-6", Journal of Audio Engineering Society, vol. 28, No. 4, pp. 260-265, (Apr. 1980).
Patent Abstracts of Japan, vol. 4, No. 90, P17, 572, (Jul. 27, 1980), Japanese Patent No. 55-52515.

*Primary Examiner*—David H. Malzahn
*Attorney, Agent, or Firm*—Finnegan, Henderson, Farabow, Garrett & Dunner

[57] ABSTRACT

A PCM signal processor for extracting data and error check words from a serial PCM data block contains a serial-to-parallel converter and de-interleaver to present the words in the PCM data block synchronously, circuitry for forming an error pointer and an auxiliary error pointer from the words in the PCM data block error pointer, delay circuitry for forming a data word from the error pointer and the auxiliary error pointer, and error correction and detection circuitry using the data word error pointer.

4 Claims, 9 Drawing Figures

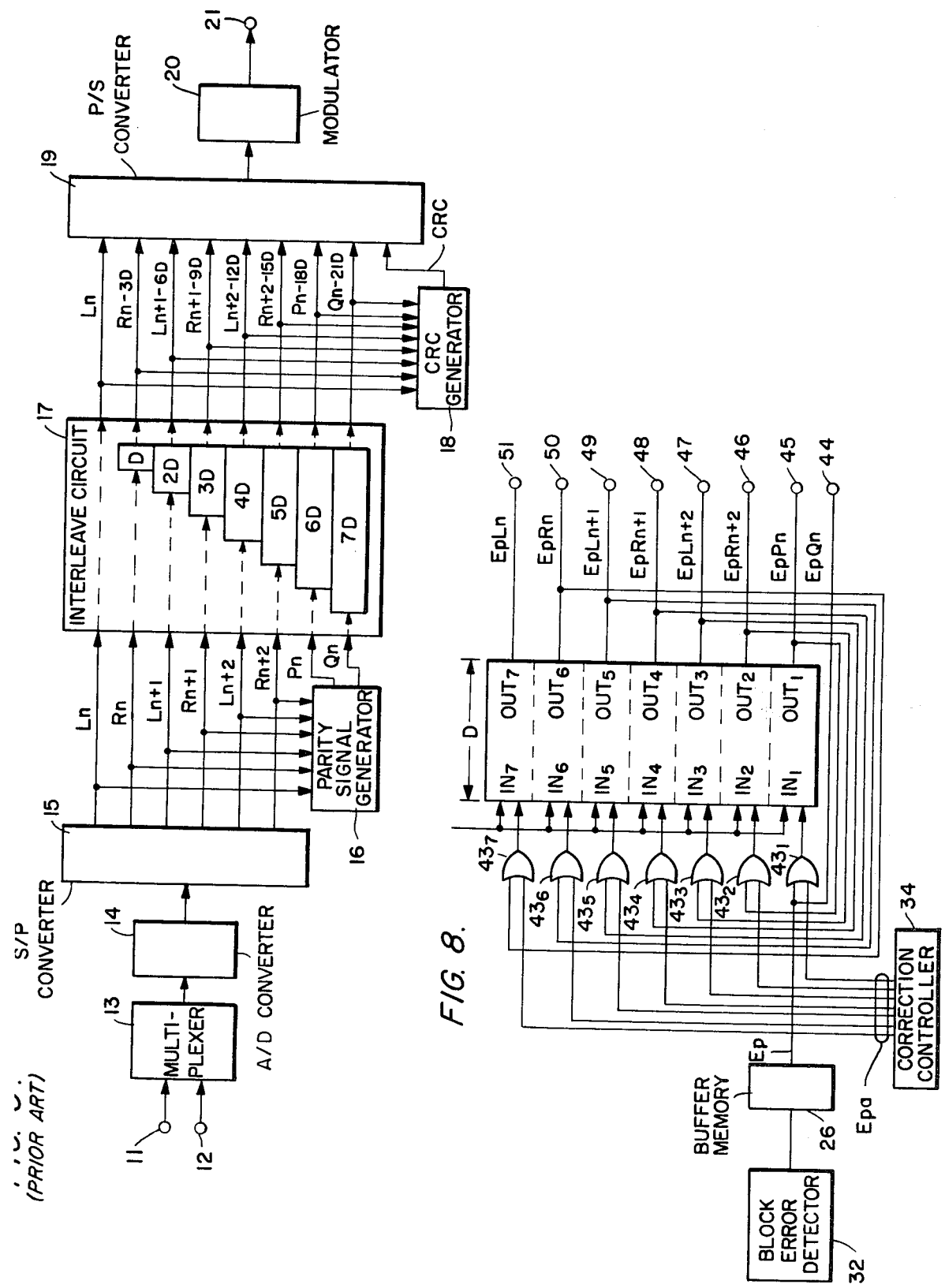

PCM SIGNAL PROCESSOR WITH ERROR DETECTION AND CORRECTION CAPABILITY PROVIDED BY A DATA ERROR POINTER

FIELD OF THE INVENTION

This invention relates to a PCM (pulse code modulation) signal processor, and more particularly, to a PCM signal processor for a PCM audio signal decoder used with a VTR (video tape recorder).

BACKGROUND OF THE INVENTION

In the field of audio engineering, digital technology has been used most often in the design of professional equipment. Recently, consumer video cassette tape recorders have incorporated digital technology and movement toward using digital data in consumer audio equipment appears to be accelerating.

A major reason for this trend is that the PCM recording and playback system, which is made possible by combining a video tape recorder (VTR) and digital technology, has a much broader dynamic range than do conventional analog tape recorders. Another reason is that in comparison with those conventional recorders, the PCM system has practically no wow and flutter. Also, the PCM systems' frequency and distortion characteristics are substantially superior to those of analog systems.

A PCM audio system connected to a VTR requires a digital signal processor to transform the PCM signal format to and from the appropriate television signal format. The format of the PCM audio signal may be the one prescribed by the EIAJ (Electronic Industries Association of Japan) Technical File: STC-007, which employs bit error correction schemes together with interleaving techniques. This format will be described in detail below.

The PCM audio signals are encoded in the EIAJ format for the VTR by delaying the interleaving of the data words and by adding both an error correction check word and an error detection check word. Conventional PCM signal processors for decoding the encoded PCM audio signals include de-interleave circuits which contain several error pointer signals for error detection and correction. The error pointer signals are given different amounts of delay by branching an original error pointer signal through parallel delay lines of the de-interleave circuits.

One major problem with the prior art PCM decoders is that the error correction mechanism malfunctions every time there is an erroneous error pointer signal.

SUMMARY OF THE INVENTION

It is, therefore, an object of the present invention to reduce the malfunctions of error correction in a PCM signal processor.

According to the present invention, the PCM signal processor for extracting data words from a serial PCM data block also containing an error detection and correction code comprises: serial-to-parallel converter means for converting the serial PCM data block into a parallel format, the serial-to-parallel converting means having terminals each outputting in parallel a different one of said data words and the error detection and correction code; means connected to the terminals of the serial-to-parallel converter means for forming an error pointer from the data words and the error detection and correction code, the error pointer indicating which of the data words at the outputs of the serial-to-parallel converter means contains an error; deinterleave means connected to the terminals of the serial-to-parallel converter means for adding different delays to the data words such that all of the data words appear synchronously at the output of the de-interleave means; means connected to the deinterleave means for forming an auxiliary error pointer indicating whether any of the data words at the output of the deinterleave means contains an error, the auxiliary error pointer indentifying which of the data words at the output of the deinterleave means contains an error; an error pointing delay means for combining the error pointer and the auxiliary error pointer to form data word error pointers, each data word error pointer corresponding to a different data word and indicating whether the corresponding data word contains an error, the error pointing delay means also synchronizing the data word error pointers with its corresponding data word; and means for detecting and correcting errors in the data words using the data word error pointers.

Additional objects and advantages of the present invention will become apparent to persons skilled in the art from the following detailed description and the accompanying drawings.

BRIEF DESCRIPTION OF THE DRAWINGS

FIG. 5 shows a block diagram of a conventional encoder for transforming PCM audio signals to VTR format signals;

FIG. 8 shows a detailed circuit diagram of the error pointer delaying circuit shown in FIG. 7.

DESCRIPTION OF THE PREFERRED EMBODIMENT

The present invention will be described in detail with reference to the accompanying drawings FIG. 1 to FIG. 8. Throughout the drawings, like reference letters and numerals will be used to designate like or equivalent elements.

Before describing the invention, it is necessary to describe the EIAJ signal format. This will be done by referring to FIG. 1 through FIG. 4B.

When PCM encoding analog audio signals, two channels of stereophonic analog signals (L and R) are individually sampled at about 44 kHz. Each sample becomes a 14-bit or 16-bit PCM data word in a video signal portion of the standard television (TV) signal.

Figure 1:
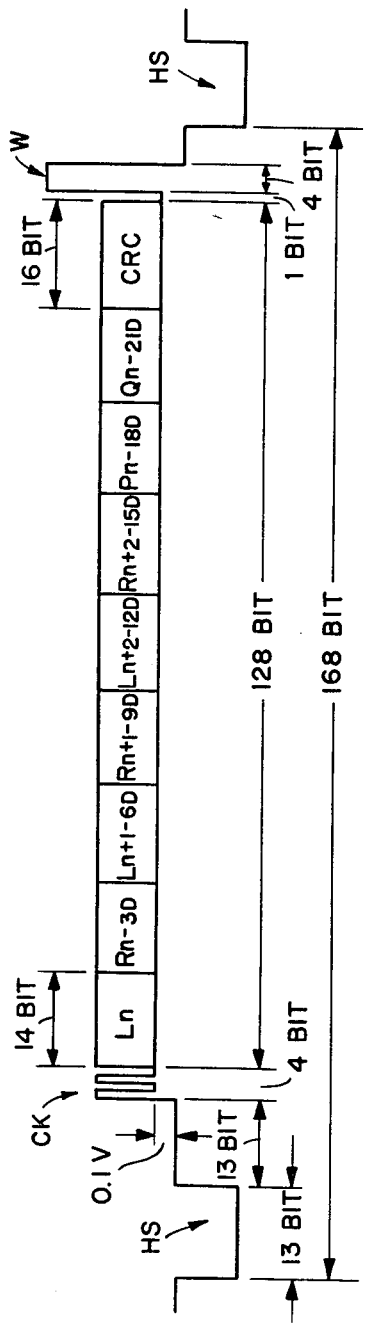
FIG. 1 shows one type of word signal allocation according to the EIAJ format for a horizontal line a scanning period of TV signal.

FIG. 1 shows an example of a waveform and data format of one horizontal scanning period (1H period)

when the sample becomes a 14-bit data word. Each video signal block in a single horizontal line contains six PCM data words ($L_n$, $R_{n-3D}$, $L_{n+1-6D}$, $R_{n+1-9D}$, $L_{n+2-12D}$ and $R_{n+2-15D}$) plus two check words ($P_{n-18D}$ and $Q_{n-21D}$) for error correction, and one CRC word for error detection. This totals a 9-word, 128-bit data block, for each horizontal scanning period.

The CRC word consists of 16 bits, but all other words are 14 bits. The PCM data words are shown in FIG. 1. L and R correspond, respectively, to the left and right channels of the sampled data. The suffixes represent the number of the sample in the sampling order.

In the format shown in FIG. 1, the data is interleaved such that each data word, including the six PCM data words and the two check words P and Q, are successively shifted 16 blocks (or equivalently 16 horizontal lines). The letter D in the suffixes of the sample data words in FIG. 1 represents both number of blocks of the interleave and the equivalent amount of time necessary to transmit that number of blocks. In this case, the number of blocks of the interleave is 16, which is equivalent to a word-interleave of 3D=48 words since there are two channels and three words from each channel in a data block.

The horizontal line (1H) in FIG. 1 is 168 bits long. This 168-bit line comprises a 13 bit long horizontal sync signal HS, followed by an interval of 13 bits, then a 4-bit clock signal CK for synchronization of data. The code of the data synchronization signal CK is "1010." The 128-bit data block described above is next, followed by a signal bit representing a "0," a white reference signal W of 4 bits and a 5-bit long null signal.

Figure 2:
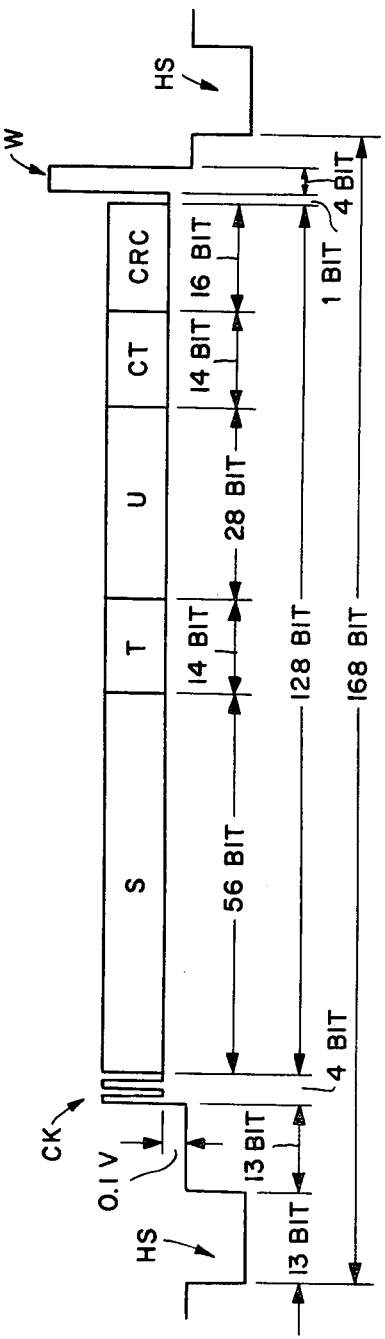
FIG. 2 shows a control signal allocation for a horizontal scanning period.

FIG. 2 shows a 1H horizontal line containing a control signal data block. This format is the same as that of FIG. 1 except that the 128-bit data block in FIG. 1 is replaced by a 128-bit control data block. The 128-bit control data block in this case comprises a 56-bit heading signal word S, a 14-bit content discrimination signal word T, a 28-bit address signal word U, a 14-bit control signal word CT, and the previously mentioned 16-bit CRC error detection word.

The content of the 14-bit control signal word CT is set as shown in Table 1.

TABLE 1

| Bit No. | Code Content | Control content | Bit content |
| --- | --- | --- | --- |
| 1 to 10 | No prescription | — | 0 |
| 11 | Dubbing inhibition code | Absent | 0 |
| 12 | P correction discrimination code | Present | 0 |
| 13 | Q correction discrimination code | Present | 0 |
| 14 | Pre-emphasis discrimination code | Present | 0 |

In Table 1, the Q correction discrimination code is "0" representing the "presence" when each word of the PCM audio signal is 14 bits. When each word comprises 16 bits, the data format shown in FIG. 3, the Q correction discrimination code is "1" representing "absence."

Figure 3:
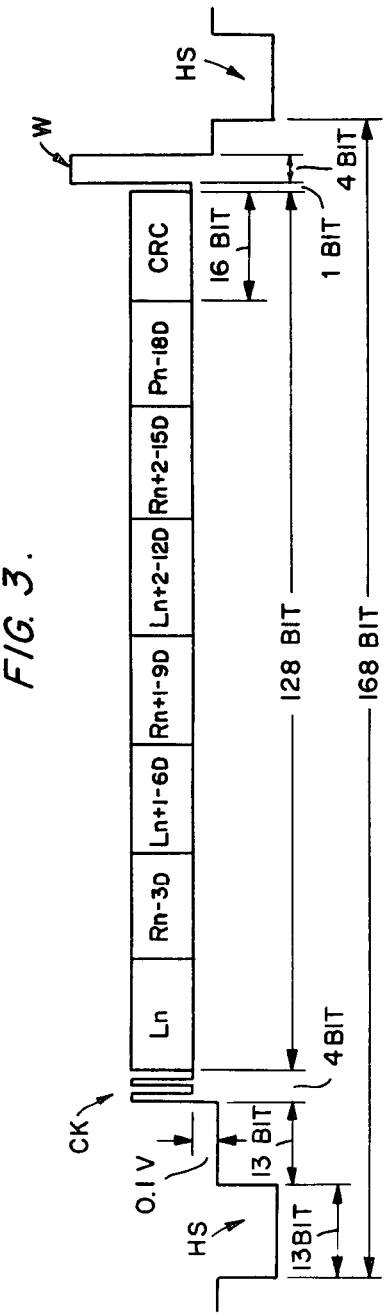
FIG. 3 shows another type of word signal allocation for a horizontal scanning period.

FIG. 3 shows an example of the data block in which each sample data word of the PCM audio signal is 16 bits. In this case, the 128-bit data block comprises six 16-bit words (three left and three right channel audio signals), a 16-bit error correction word P and a 16-bit CRC error detection word, for a total of eight words.

Figure 4A:
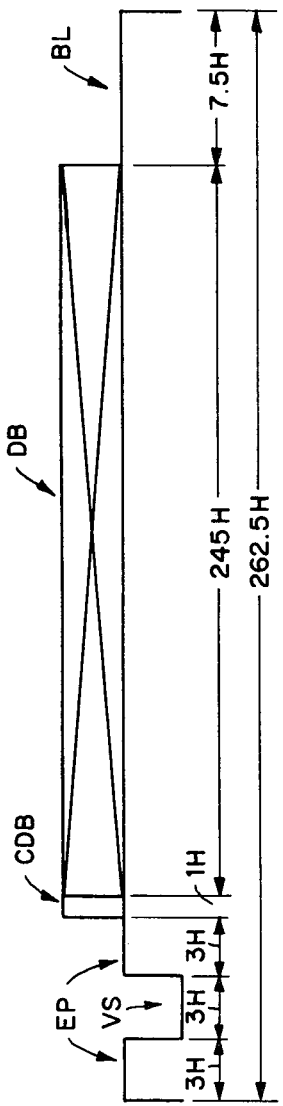
FIG. 4A shows a signal allocation for an even vertical field of a TV signal.
Figure 4B:
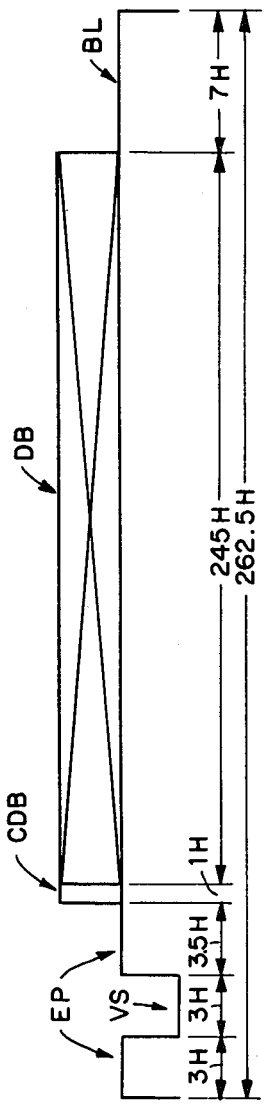
FIG. 4B shows a signal allocation for an odd vertical field of a TV signal.

The above data signals for 1H horizontal lines are arranged in a vertical scanning field as shown, for example, in FIGS. 4A and 4B. FIG. 4A corresponds to an odd field, and FIG. 4B corresponds to an even field.

Each field begins with an equivalent pulse EP, a vertical sync signal VS, and another EP. The control signal block CDB (see FIG. 2) is the 10th horizontal line in the odd field (see FIG. 4A) and the 10.5th horizontal line in the even field (see FIG. 4B). After the CDB, there are 245 horizontal lines (see FIGS. 1 and 3) in the data block DB and the remaining horizontal lines constitute a blank period BL.

Of the 262.5 horizontal lines constituting one vertical field in FIGS. 4A and 4B, the 16.5 lines which do not contain the control signal block CDB or one of the 245 lines in the data block DB correspond to the vertical blanking period of the standard television signal.

FIG. 5 is a block diagram of an encoder for converting the analog audio signals into the interleaved PCM data format signals for the data block of the horizontal line shown in FIG. 1.

The analog audio signals from the left and right channels are inputted through input terminals 11 and 12 into multiplexor 13. Multiplexor 13 alternately samples the left and right audio signals at a sampling frequency of about 44 kHz. Each sampled signal from multiplexor 13 is then routed to analog-to-digital converter (hereinafter "A/D converter") 14 where the sampled signals are converted into PCM signal data words (hereinafter "data words"). In the encoder shown in FIG. 5, each data word has 14 bits.

The data words from A/D converter 14 are then inputted to serial-to-parallel converter (hereinafter "S/P converter") 15 where they become individual words $L_n$, $R_n$, $L_{n+1}$, $R_{n+1}$, $L_{n+2}$ and $R_{n+2}$. Each individual data word is outputted from a different terminal corresponding to the data word.

These data words are applied to parity signal generator 16 which generates check words P and Q in accordance with operations for those data words. The six data words, $L_n$ through $R_{n+2}$, and the two check words, P and Q, are applied to interleave circuit 17 which comprises several delay circuits. Data word $L_n$ is not delayed as it passes through interleave circuit 17 but the other five data words, $R_n$, $L_{n+1}$, $R_{n+1}$, $L_{n+1}$ and $R_{n+2}$, and two check words, P and Q, are delayed by different amounts equal to times D through 7D, respectively. D was defined above as the time necessary to transmit the number of blocks in the interleave. Words $L_n$ through $Q_{n-21D}$ outputted from interleave circuit 17 are applied to error detection check word generator (hereinafter "CRC generator") 18 which generates a CRC check word for error detection of data words $L_n$ through $Q_{n-21D}$.

The eight interleaved words $L_n$ through $Q_{n-21D}$ from interleave circuit 17 plus the CRC check word from CRC generator 18 are converted into a single-line, time-shared signal by parallel-to-serial converter (herinafter "P/S converter") 19.

The output of P/S converter 19 is applied to TV signal modulator 20 which converts the single-line, time-shared signal into a proper TV signal format which is then sent to VTRs (not shown) via output terminal 21. This format is represented by the data block shown FIG. 1, which includes the six data words $L_n$ through $R_{n+2-15D}$ and three check words $P_{n-18D}$, $Q_{n-21D}$ and CRC.

Figure 6:
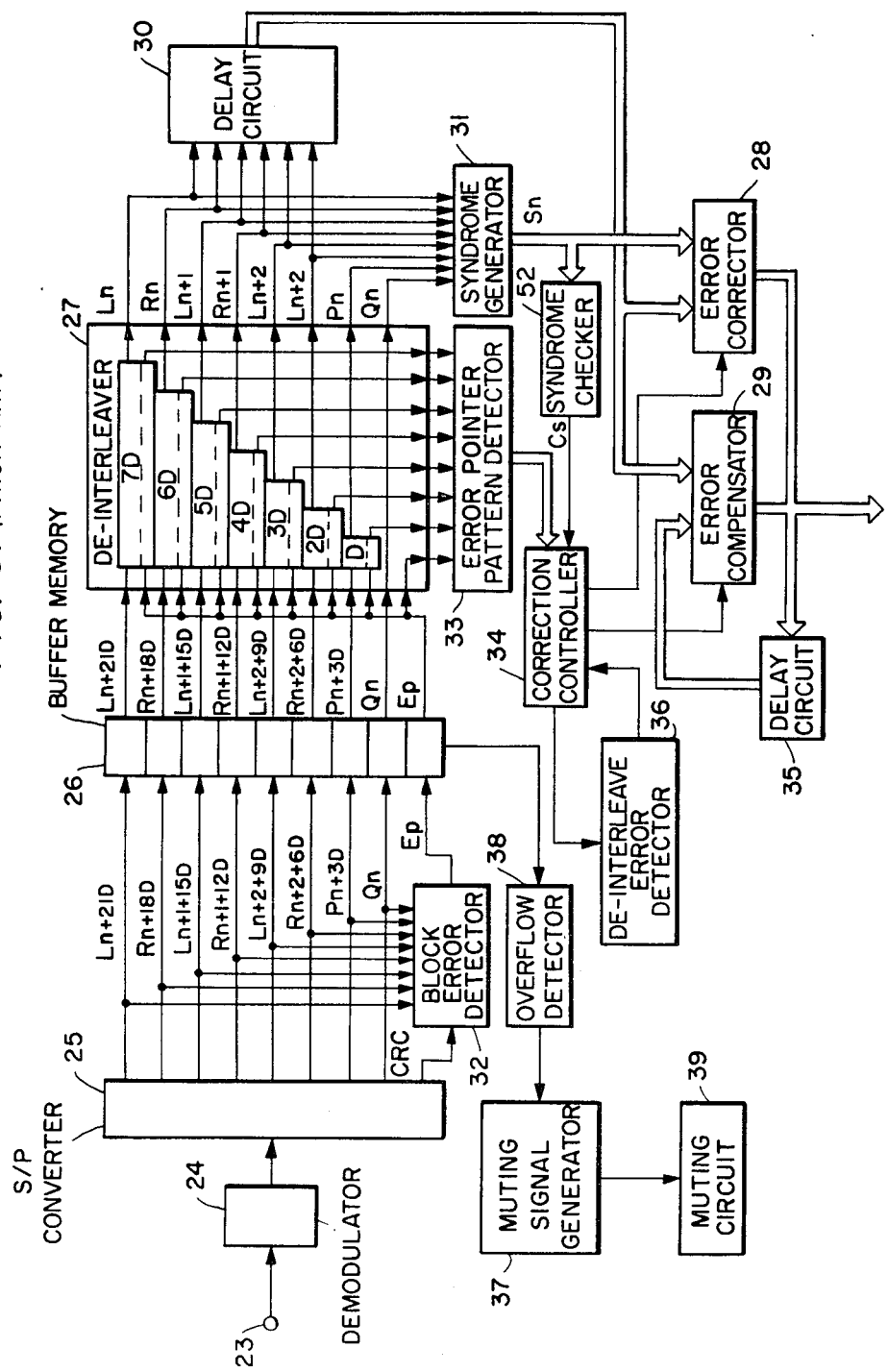
FIG. 6 shows a block diagram of a prior art PCM signal decoder for restoring PCM signals from VTR format signals.

FIG. 6 is a block diagram of an audio signal decoder. A detailed description of some of the elements not fully explained below may be found in AES (Audio Engineering Society) PREPRINT 1560 (G-5) for the 64th Convention (Nov. 2-5, 1979) in New York City). Modulated PCM audio signals reproduced from a VTR (not shown) are inputted through terminal 23 into TV signal demodulator 24. Demodulator 24 extracts and shapes the waveforms of the signals and forms a data block similar to the one in FIG. 1.

The data block from demodulator 24 is then applied to S/P converter 25 which divides the the data block into individual PCM words: $L_{n+21D}$, $R_{n+18D}$, $L_{n+1+15D}$, $R_{n+1+12D}$, $L_{n+2+9D}$, $R_{n+2+6D}$, $P_{n+3D}$, $Q_n$ and CRC. Received signals $L_{n+21D}$ through $Q_n$ have the same relative timing as encoded signals $L_n$ through $Q_{n-21D}$ shown in FIG. 5. The only difference is that the encoded signals are referenced to $L_n$ while the received signals are referenced to $Q_n$.

The PCM words are outputted from nine parallel output terminals and all except the CRC word are stored in buffer memory 26. Buffer memory 26 time-expands the PCM words and compensates any jitters in the PCM words.

The six data words from buffer memory 26, $L_{n+21D}$ through $R_{n+2+6D}$, as well as the two check words, $P_{n+3D}$ and $Q_n$, are applied to de-interleave circuit 27. De-interleave circuit 27 comprises delay circuits through which seven words $L_{n+21D}$, $R_{n+18D}$, $L_{n+1+15D}$, $R_{n+1+12D}$, $L_{n+2+9D}$, $R_{n+2+6D}$, and $P_{n+3D}$ are delayed by different amounts, 7D through D, respectively. Check word $Q_n$ is not delayed. The output of de-interleave circuit 27 presents the data and check words synchronously in parallel and in the order that they appeared at the input terminals of interleave circuit 17 in FIG. 5: $L_n$, $R_n$, $L_{n+1}$, $R_{n+1}$, $L_{n+2}$, $R_{n+2}$, $P_n$, $Q_n$.

Data words $L_n$, $R_n$, $L_{n+1}$, $R_{n+1}$, $L_{n+2}$, and $R_{n+2}$ are outputted from de-interleave circuit 27 to both error corrector 28 and error compensator 29 through one-block delay circuit 30. Also from de-interleave circuit 27, data words $L_n$ through $R_{n+2}$, together with check words $P_n$ and $Q_n$, are inputted to syndrome generator 31 which generates a syndrome word Sn from words $L_n$ through $Q_n$. Syndrome word $S_n$ checks for errors in words $L_n$ through $Q_n$ and is applied to error corrector 28 to correct any errors in data words $L_n$ through $R_{n+2}$. $S_n$ is also sent to syndrome checker 52 which generates a syndrome check signal, $C_s$. $C_s$ is a "1" when $S_n$ indicates that one or more errors exist in signals $L_n$ through $Q_n$.

The six data words from S/P converter 25, $L_{n+21D}$, $R_{n+18D}$, $L_{n+1+15D}$, $R_{n+1+12D}$, $L_{n+2+9D}$ and $R_{n+2+6D}$, plus the two error correction check words, $P_{n+3D}$ and $Q_n$, are also inputted to block error detector 32 together with error detection check word CRC. Based on the CRC check word, error detector 32 generates an error pointer (Ep) for every word $L_{n+21D}$ through $Q_n$. Error pointer Ep comprises pointers $Ep_{Ln+21D}$ through $Ep_{Qn}$ corresponding to words $L_{n+21D}$ through $Q_n$.

Ep passes through buffer memory 26 and de-interleave circuit 27 into error pointer pattern detector 33. De-interleave circuit 27 processes Ep with the PCM word with which pointers $EpL_{n+21D}$ through $EpQ_n$ correspond. Thus, the error pointer for data word $L_n$, $Ep_{Ln}$, is applied to error pointer pattern detector 33 from de-interleave circuit 27 at the same time that data word $L_n$ is outputted from de-interleave circuit 27. Similarly, the error pointer for data word $R_n$, $Ep_{Rn}$, is applied to error pointer pattern detector 33 when data word $R_n$ is outputted from de-interleave circuit 27, and the same process holds true for the other data words. On the basis of error pointers $Ep_{Ln}$ through $Ep_{Qn}$, error pointer pattern detector 33 detects any errors occurring in a PCM word.

The output of error pointer pattern detector 33 is sent to correction controller 34 together with syndrome check signal $C_s$. The outputs of correction controller 34 are connected to the control terminals of error corrector 28 and error compensator 29. Any errors in data words $L_n$ through $R_{n+2}$ (from one-block delay circuit 30) are corrected by error corrector 28 using syndrome word $S_n$. If, however, there are too many errors, error corrector 28 cannot make the correction, so the erroneous data words are compensated by error compensator 29 using bits from corresponding words from the previously received data block. These bits are available through one-block delay circuit 35.

The output of correction controller 34 is connected to de-interleave error detector 36. De-interleave error detector 36 checks the signals from controller 34 to determine whether de-interleave circuit 27 has malfunctioned. Detector 36 sends this determination back to correction controller 34. Correction controller 34 then uses that determination to control error compensator 29 when there is any de-interleaving at de-interleave circuit 27.

Overflow detector 38 detects an overflow of buffer memory 26. The output of overflow detector 38 feeds an input terminal of muting signal generator 37. The muting signal generated by muting signal generator 37 is sent to muting circuit 39 where, under the control of the muting signal, erroneous bits are muted into a logic "0".

The PCM audio signal decoder shown in FIG. 6 has several limitations. First, if block error detector 32 fails to detect a block error because of a malfunction in its detecting operation, every error pointer in de-interleave circuit 27 is then erroneous. If that happens, error corrector 28 and error compensator 29 cannot correct or compensate errors in the data words since the erroneous error pointers are not correctly identifying the errors.

Second, if drop-out compensation is being practiced in the VTRs, the block error detector 32 will fail to detect block error for the compensated data block and the error corrector 28 and error compensator 29 will again fail to correct or compensate the errors.

Figure 7:
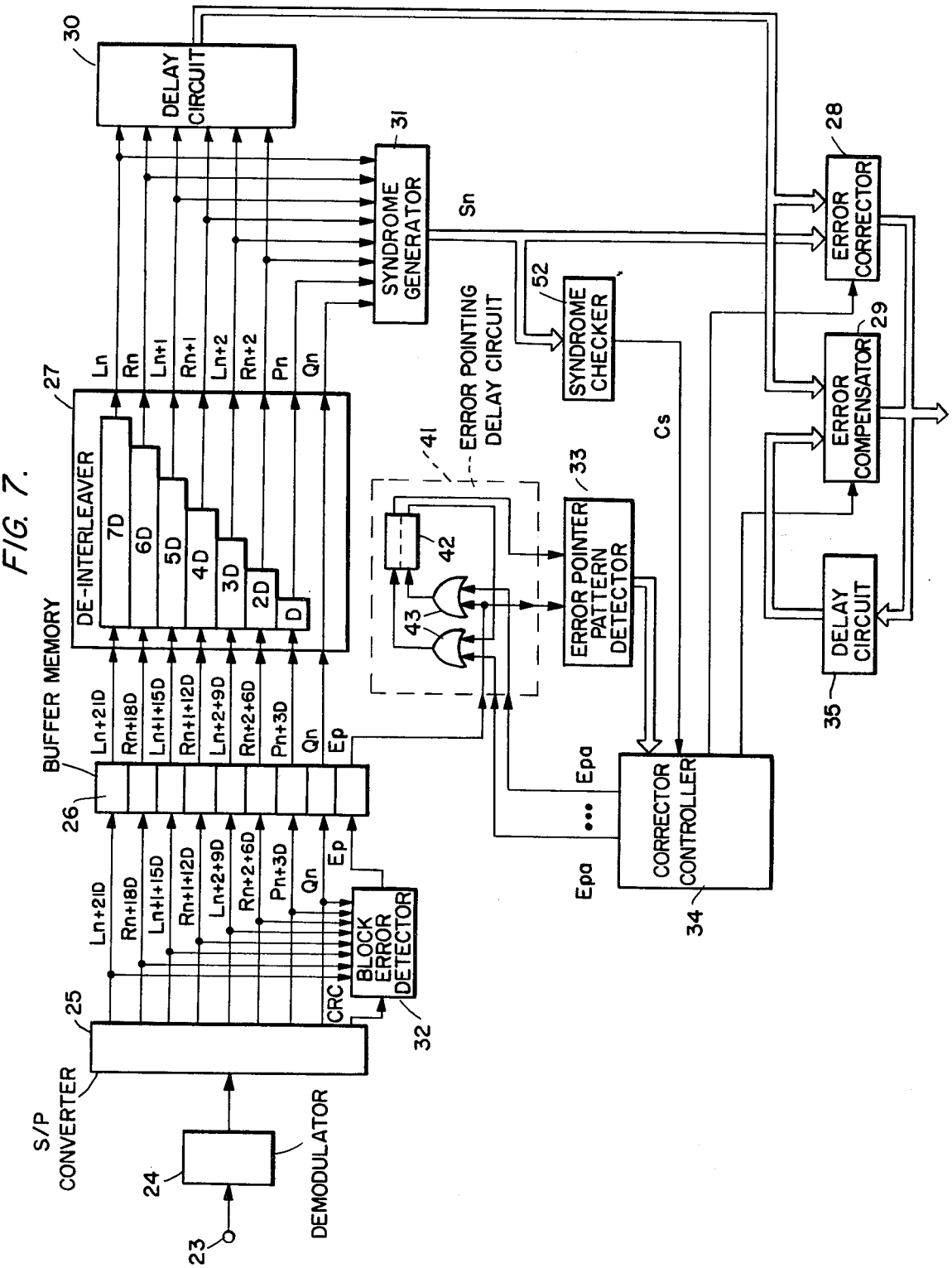
FIG. 7 shows a block diagram for one embodiment of a PCM signal processor according to the present invention.

FIG. 7 shows a block diagram of one embodiment of the PCM audio signal decoder of the present invention. This decoder comprises many of the same circuits as are in the PCM audio signal detector shown in FIG. 6. A principal difference between the detectors is error pointing delay circuit 41 which will be described in detail below. The circuits in FIG. 7 which are the same as those in FIG. 6 will not be reexplained since their operation is the same as in FIG. 6.

In FIG. 7, error pointer Ep generated by block error detector 32 is branched to error pointer pattern detector 33 through buffer memory 26 and error pointer delaying circuit 41. Error pointer delaying circuit 41 includes a parallel-type shift register 42 having seven registers or delay units, as shown in detail in FIG. 8. Each delay unit delays its input signal by time D. This is done with a clock signal having a frequency 1/D which is derived from the CK field of the PCM data word.

Circuit 41 also includes seven OR gates 43, also shown in detail in FIG. 8. Each OR gate has two inputs. One input is an auxiliary error pointer Epa from correction controller 34 and the other input is essentially error pointer Ep delayed by some amount.

Correction controller 34 receives signals from word check $C_s$ from syndrome checker 52 and forms auxiliary error pointers Epa. By auxiliary error pointer Epa, controller 34 effectively routes syndrome check word $C_s$ to the appropriate OR gates 43. Correction controller 34 ensures that if $C_s$ is a "1," that logic "1" appears on the proper Epa line to synchronize with the data word which is incorrect. Thus, if syndrome checker 31 detects an error in signal $L_{n+1+15D}$, the signal $C_s$ is a "1" when $L_{n+1}$ is outputted from the de-interleave circuit 27. The signal $C_s$ is applied to the fifth register unit in FIG. 8 via OR gate $43_5$.

FIG. 8 shows that error pointer Ep is also applied to input $IN_1$ of the first delay unit via OR gate 43. Because de-interleave circuit 27 does not delay $Q_n$ from S/P converter 25, Ep is also connected to error pointer pattern detector 33 (not shown) via terminal 44, the $Ep_{Qn}$ terminal. Error pointer $Ep_{Pn}$ at output $OUT_1$ of the first delay unit, is applied to error pointer pattern detector 33 via terminal 45, as well as to input $IN_2$ of the second delay unit via OR gate $43_2$. Error pointers $Ep_{Rn+2}$ through $Ep_{Rn}$ on outputs $OUT_2$ through $OUT_6$, respectively, are applied to error pointer pattern detector 33 via terminals 46 through 50 respectively and are applied to inputs $IN_3$ through $IN_7$, respectively, via OR gates $43_3$ through $43_7$, respectively. Error pointer $Ep_{Ln}$ on output $OUT_7$ of seventh delay unit is applied to error pointer pattern detector 33 via terminal 51. The signals at terminals 44 through 51 are called data word error pointers.

The error pointer delaying circuit 41 in FIGS. 7 and 8 accomplishes two novel and nonobvious results. First, if block error detector 32 fails to detect a block error due to a malfunction or because of any drop-outs in words being compensated at the VTR stage, syndrome checker 52 may detect these errors and a correct error pointer can then be supplied to error pointer pattern detector 33.

Second, the corrected error pointer will be supplied synchronously with the output of the corresponding words from de-interleave circuit 27. Thus, the error pointer for data word $L_n$, $Ep_{Ln}$, is applied to error pointer pattern detector 33 from output $OUT_7$ when data word $L_n$ is outputted from de-interleave circuit 27. Similarly, the error pointer for data word $R_n$, $Ep_{Rn}$, is applied to error pointer pattern detector 33 from output $OUT_6$ when data word $R_n$ is outputted from de-interleave circuit 27. The other pointers and words are similarly synchronized. The error pointer for check word $Q_n$, $Ep_{Qn}$, is directly applied to error pointer pattern detector 33 since check word $Q_n$ is not delayed by interleave circuit 27.

This synchronization can also be seen by following the example described above wherein block error detector 32 failed to detect an error in word $L_{n+1+15D}$. As indicated, a logic "1" would be applied to the fifth register unit in FIG. 8 via OR gate 43. This, however would also cause a "1" to be later translated to the sixth and seventh register units in order and then outputted from terminals 50 and 51. But when that occurs, the timing is such that error pointer pattern detector 33 is not paying attention to terminals 50 and 51.

It will be apparent to these skilled in the art that various modifications and variations can be made in the PCM signal processor of the present invention, and especially in the construction of error pointer delaying circuit 41, without departing from the scope or spirit of the invention. It is intended that the present invention cover such modifications and variations provided they come within the scope of the appended claims and their equivalents.

What is claimed is:

1. A pulse code modulation (PCM) signal processor for extracting data and check words from a serial PCM data block also containing an error detection and correction code, said signal processor comprising:
    serial-to-parallel converter means for converting said serial PCM data block into a parallel format, said serial-to-parallel converting means having terminals each outputting in parallel a different one of said data and check words and said error detection and correction code;
    means connected to said terminals of said serial-to-parallel converter means for forming an error pointer from said data and check words and said error detection and correction code, said error pointer indicating which of said data and check words at said outputs of said serial-to-parallel converter means contains an error;
    de-interleave means connected to said terminals of said serial-to-parallel converter means for adding different delays to said data and check words such that all of said data and check words appear synchronously at the output of said de-interleave means;
    means connected to said de-interleave means for forming an auxiliary error pointer indicating whether any of said data and check words at the output of said de-interleave means contains an error, said auxiliary error pointer identifying which of said data and check words at the output of said de-interleave means contains an error;
    an error pointing delay means for combining said error pointer and said auxiliary error pointer to form data word error pointers, each data word error pointer corresponding to a different data and check word and indicating whether the corresponding data or check word contains an error, said error pointing delay means also synchronizing each said data word error pointer with its corresponding data word; and
    means for detecting and correcting errors in said data words using said data word error pointers.

2. The PCM signal processor in claim 1 wherein said error pointing delay means includes a first number of sequential storage registers containing said data word error pointers, said first number being one less than the number of data and check words in said PCM data block.

3. The PCM signal processor in claim 2 wherein said error pointing delay means includes a first number of OR gates, each OR gate having an output connected to an input of a different storage register, one input of each of said OR gates connected to said auxiliary error pointer and each of said OR gates except a first OR gate which is connected to the first storage register, having a second input connected to the output of the register preceding the register to which the OR gate is connected, the second input of said first OR gate being connected to said error pointer.

4. The PCM signal processor in claims 1, 2, or 3 wherein said de-interleave means contains means to impart no delay to a last data word occurring later than the other data words in said serial PCM data block and adding a delay iD to said other data words where D is the time required to transmit the number of blocks in the interleave of the PCM data block and where i is an integer indicating the number of data word positions of a particular data word from said last data word.

* * * * *